(12) United States Patent
Garoutte

(10) Patent No.: US 7,650,058 B1
(45) Date of Patent: Jan. 19, 2010

(54) OBJECT SELECTIVE VIDEO RECORDING

(75) Inventor: Maurice V. Garoutte, St. Louis, MO (US)

(73) Assignee: Cernium Corporation, Reston, VA (US)

( * ) Notice: Subject to any disclaimer, the term of this patent is extended or adjusted under 35 U.S.C. 154(b) by 1033 days.

(21) Appl. No.: 10/041,402

(22) Filed: Jan. 8, 2002

Related U.S. Application Data

(60) Provisional application No. 60/337,558, filed on Nov. 8, 2001.

(51) Int. Cl.
  *H04N 7/00* (2006.01)
  *H04N 5/91* (2006.01)
  *H04N 7/26* (2006.01)
  *G06K 9/00* (2006.01)
  *G06K 9/46* (2006.01)

(52) U.S. Cl. .......................... 386/95; 386/69; 386/109; 386/111; 386/129; 382/103; 382/104; 382/203

(58) Field of Classification Search ................. 386/111, 386/109, 129, 68, 69, 95; 382/103, 104, 382/203
See application file for complete search history.

(56) References Cited

U.S. PATENT DOCUMENTS

| | | | |
|---|---|---|---|
| 5,434,617 A | | 7/1995 | Bianchi |
| 5,455,561 A | | 10/1995 | Brown |
| 5,579,471 A | * | 11/1996 | Barber et al. ............... 715/700 |
| 5,602,585 A | | 2/1997 | Dickinson et al. |
| 5,689,442 A | | 11/1997 | Swanson et al. |
| 5,706,367 A | * | 1/1998 | Kondo ........................ 382/236 |
| 5,724,475 A | * | 3/1998 | Kirsten ........................ 386/109 |
| 5,729,295 A | * | 3/1998 | Okada ................... 375/240.13 |
| 5,745,166 A | | 4/1998 | Rhodes et al. |
| 5,761,326 A | | 6/1998 | Brady et al. |
| 5,809,200 A | | 9/1998 | Nishimoto et al. |
| 5,825,413 A | | 10/1998 | Mullis |
| 5,886,743 A | * | 3/1999 | Oh et al. ................. 375/240.02 |
| 5,923,364 A | | 7/1999 | Rhodes et al. |

(Continued)

FOREIGN PATENT DOCUMENTS

WO    WO 96/31047    10/1996

OTHER PUBLICATIONS

International Search Report and Written Opinion for International application No. PCT/US2006/28843, dated Sep. 25, 2007, 12 pages.

(Continued)

*Primary Examiner*—Thai Tran
*Assistant Examiner*—Daquan Zhao

(57) ABSTRACT

An object selective video analysis and recordation system in which one or more video cameras provide video output to be recorded in a useful form on recording media with reduction of the amount of the recording media, with preservation of intelligence content of the output. Video output is both background video and object video, as images of objects appearing against a background scene. Preset knowledge of symbolic categories of objects in the scene and analysis of object attributes is provided by the system. Spatial resolution and temporal resolution of objects in the scene are automatically varied in accordance with preset criteria based on predetermined interest in the object attributes while recording the background video and object video. A user of the system may query recorded video images by content, enabling the user to recall recorded data according to symbolic content, by requesting data with specified symbolic content.

14 Claims, 4 Drawing Sheets

U.S. PATENT DOCUMENTS

| | | | | |
|---|---|---|---|---|
| 5,953,488 | A | * | 9/1999 | Seto .................... 386/109 |
| 5,982,418 | A | | 11/1999 | Ely |
| 6,031,573 | A | | 2/2000 | MacCormack et al. |
| 6,043,847 | A | * | 3/2000 | Kadono et al. ......... 348/420.1 |
| 6,069,655 | A | | 5/2000 | Seeley et al. |
| 6,075,559 | A | * | 6/2000 | Harada .................... 348/148 |
| 6,097,429 | A | | 8/2000 | Seeley et al. |
| 6,122,411 | A | | 9/2000 | Shen et al. |
| 6,148,030 | A | * | 11/2000 | Katata et al. ........... 375/240.1 |
| 6,148,140 | A | * | 11/2000 | Okada et al. ............ 386/105 |
| 6,151,413 | A | * | 11/2000 | Jang ...................... 382/243 |
| 6,166,763 | A | | 12/2000 | Rhodes et al. |
| 6,182,069 | B1 | * | 1/2001 | Niblack et al. ................ 707/6 |
| 6,233,356 | B1 | * | 5/2001 | Haskell et al. ............. 382/243 |
| 6,307,885 | B1 | * | 10/2001 | Moon et al. ........... 375/240.08 |
| 6,330,025 | B1 | | 12/2001 | Arazi et al. |
| 6,437,819 | B1 | | 8/2002 | Loveland |
| 6,469,737 | B1 | | 10/2002 | Igarashi et al. |
| 6,493,022 | B1 | | 12/2002 | Ho et al. |
| 6,504,479 | B1 | | 1/2003 | Lemons et al. |
| 6,512,793 | B1 | * | 1/2003 | Maeda ............... 375/240.08 |
| 6,542,621 | B1 | * | 4/2003 | Brill et al. .................. 382/103 |
| 6,546,120 | B1 | | 4/2003 | Etoh et al. |
| 6,560,366 | B1 | * | 5/2003 | Wilkins ...................... 382/236 |
| 6,573,907 | B1 | * | 6/2003 | Madrane ..................... 715/719 |
| 6,591,006 | B1 | | 7/2003 | Niemann |
| 6,628,323 | B1 | | 9/2003 | Wegmann |
| 6,628,887 | B1 | | 9/2003 | Rhodes et al. |
| 6,680,745 | B2 | | 1/2004 | Center et al. |
| 6,707,486 | B1 | | 3/2004 | Millet et al. |
| 6,771,306 | B2 | | 8/2004 | Trajkovic et al. |
| 6,798,977 | B2 | * | 9/2004 | Maeda ..................... 386/111 |
| 6,879,705 | B1 | * | 4/2005 | Tao et al. .................... 382/103 |
| 7,020,335 | B1 | * | 3/2006 | Abousleman ............. 382/199 |
| 7,423,669 | B2 | | 9/2008 | Oya et al. |
| 7,428,000 | B2 | | 9/2008 | Cutler |
| 7,469,139 | B2 | | 12/2008 | van de Groenendaal |
| 2001/0043270 | A1 | | 11/2001 | Lourie et al. |
| 2001/0046262 | A1 | * | 11/2001 | Freda .................... 375/240.03 |
| 2002/0030741 | A1 | | 3/2002 | Broemmelsiek |
| 2002/0140814 | A1 | | 10/2002 | Cohen-Solal et al. |
| 2003/0071891 | A1 | | 4/2003 | Geng |
| 2003/0081504 | A1 | | 5/2003 | McCaskill |
| 2003/0125109 | A1 | | 7/2003 | Green |
| 2003/0147462 | A1 | * | 8/2003 | Maeda .................... 375/240.1 |
| 2004/0017386 | A1 | | 1/2004 | Liu et al. |
| 2004/0064838 | A1 | * | 4/2004 | Olesen et al. ................ 725/105 |
| 2004/0075738 | A1 | | 4/2004 | Burke et al. |
| 2004/0100563 | A1 | | 5/2004 | Sablak et al. |
| 2004/0119819 | A1 | | 6/2004 | Aggarwal et al. |
| 2004/0125207 | A1 | | 7/2004 | Mittal et al. |
| 2004/0143602 | A1 | | 7/2004 | Ruiz et al. |
| 2004/0169587 | A1 | | 9/2004 | Washington |
| 2004/0186813 | A1 | | 9/2004 | Tedesco et al. |
| 2004/0244047 | A1 | | 12/2004 | Shinkai et al. |
| 2004/0263636 | A1 | | 12/2004 | Cutler et al. |
| 2005/0007479 | A1 | | 1/2005 | Ahiska |
| 2005/0012817 | A1 | | 1/2005 | Hampapur et al. |
| 2005/0036036 | A1 | | 2/2005 | Stevenson et al. |
| 2005/0086704 | A1 | | 4/2005 | Rhodes et al. |
| 2005/0134450 | A1 | | 6/2005 | Kovach |
| 2005/0185823 | A1 | | 8/2005 | Brown et al. |
| 2006/0136972 | A1 | | 6/2006 | Metzger et al. |
| 2006/0165386 | A1 | | 7/2006 | Garoutte |
| 2006/0167595 | A1 | | 7/2006 | Breed |
| 2006/0195569 | A1 | | 8/2006 | Barker |
| 2007/0035623 | A1 | | 2/2007 | Garoutte |
| 2007/0094716 | A1 | | 4/2007 | Farino |

OTHER PUBLICATIONS

U.S. Office Action mailed Aug. 14, 2006, for U.S. Appl. No. 11/388,505, filed Mar. 24, 2006.
U.S. Office Action mailed Sep. 12, 2007, for U.S. Appl. No. 11/388,505, filed Mar. 24, 2006.
U.S. Office Action mailed Jan. 8, 2009 for U.S. Appl. No. 11/491,485, filed Jul. 24, 2006.
U.S. Office Action mailed Jul. 8, 2009, for U.S. Appl. No. 11/491,485, filed Jul. 24, 2006.
International Search Report and Written Opinion from International Application No. PCT/US2008/070134, 8 pages.

* cited by examiner

OBJECT SELECTIVE VIDEO RECORDING

CROSS-REFERENCE TO RELATED APPLICATION(S)

This application claims the priority of U.S. provisional patent application Ser. No. 60/337,558, filed Nov. 8, 2001, which is herein incorporated by reference, and continued preservation of which is hereby requested accordingly.

BACKGROUND OF THE INVENTION

1. Field of the Invention

The present invention relates to video recordation and, more particularly, to advantageous methods and system arrangements and apparatus for object selective video recording in automated screening systems, general video-monitored security systems and other systems, in which relatively large amounts of video might need to be recorded.

2. Known Art

Current state of the art for recording video in security and other systems is full time digital video recording to hard disk, i.e., to magnetic media as in the form of disk drives. In some systems digitized video is saved to magnetic tape for longer term storage.

A basic problem of digital video recording systems is trade-off between storage space and quality of images of stored video. An uncompressed video stream in full color, VGA resolution, and real time frame rate, may require, for example, about 93 Gigabytes (GB) of storage per hour of video. (Thus, 3 bytes/pixel*640 pixels/row/frame*480 pixels/column/frame*30 frames/sec*60 sec/min*60 min/hr.)

A typical requirement is for several days of video on PC hard disk of capacity smaller than 93 GB. To conserve disk space, spatial resolution can be reduced, frame rate can be reduced and compression can be used (such as JPEG or wavelet). Reduction of spatial resolution decreases storage as the square root of the reduction. I.e., reducing the frame size from 640×480 by a factor of 2 to 320×240 decreases required storage by a factor of 4.

Reduction of frame rate decreases storage linearly with the reduction. I.e., reducing frame rate from 30 FPS (frames per second) to 5 FPS decreases storage by a factor of 6. As frame rate decreases video appears to be "jerky."

Reduction of storage by compression causes a loss of resolution at higher compression levels. E.g., reduction by a factor of 20 using JPEG format results in blurred but may provide usable images for certain purposes, as herein disclosed.

Different methods of storage reduction discussed above are multiplicative in affect. Using the reductions of the three examples above reduces storage requirements by a factor of 480

(4*6*20) to 193 MB/hour.

Also known is use of video motion detection to save only frames with any motion in the video. The cause of the motion is not analyzed. Thus, each full frame must be stored at the preset compression. The effect of motion detection on storage requirements is dependent on the activity in the video. If there is any motion half of the time, storage requirement is reduced by a factor of two.

In the current start of the art, some attempts have been made to improve the efficiency of video recording by increasing the resolution during a period of interest.

Some time lapse VCRs have used alarm contact inputs from external systems that can cause the recording to speed up to capture more frames when some event of interest is in a camera view. As long as the external system holds the alarm contact closed the recording is performed at a higher rate; yet, because the contact input cannot specify which object is of interest the entire image is recorded at a higher temporal resolution (more frames per second) for the period of contact closure. This can be considered to be period selective recording.

Some digital video recording systems have included motion detection that is sensitive to changes in pixel intensity in the video. The pixel changes are interpreted simply as motion in the frame. In such a system, pixels are not aggregated into objects for analysis or tracking. Because accordingly there is no analysis of the object or detection of any symbolically named event, the entire image is recorded at a higher temporal resolution while the motion persists. This can be considered as motion selective recording.

The recently announced MPEG-4 Standard uses Object Oriented Compression to vary the compression rate for "objects", but the objects are defined simply by changes in pixel values. Headlights on pavement would be seen as an object under MPEG-4 and compressed the same as a fallen person. Object selective recording in accordance with the present invention is distinguished from MPEG-4 Object Oriented Compression by the analysis of the moving pixels to aggregate into a type of object known to the system, and further by the frame to frame recognition of objects that allows tracking and analysis of behavior to adjust the compression rate.

The foregoing known techniques fail to achieve storage requirement reduction provided by the present invention.

SUMMARY OF THE INVENTION

Among the several objects, features and advantages of the invention may be noted the provision of improved methods, apparatus and systems for:

facilitating or providing efficient, media-conserving, video recordation of large amounts of video data in a useful form on recording media in order to preserve the intelligence content of such images;

facilitating or providing efficient, media-conserving, video recordation of large amounts of video data, i.e., images, in a an automatic, object-selective, object-sensitive, content-sensitive manner, so as to preserve on storage media the intelligence content of such images;

facilitating or providing efficient, media-conserving, video recordation of such video data which may be of a compound intelligence content, that is, being formed of different kinds of objects, activities and backgrounds;

facilitating or providing efficient, media-conserving, video recordation of such video data on a continuous basis or over long periods of time, without using as much video storage media as has heretofore been required;

facilitating or providing efficient, media-conserving, video recordation of such mixed content video data which may be constituted both by (a) background video of the place or locale, such as a parking garage or other premises which are to be monitored by video, and (b) object video representing the many types of images of various objects of interest which at any time may happen to appear against the background;

facilitating or providing the video recordation of such video data in a highly reliable, highly accurate way, over such long periods, without continuous human inspection or monitoring;

facilitating or providing the video recordation of such video data capable of being continuously captured by video camera or cameras, which may be great in number, so as to provide a video archive having high or uncompromised intelligence value and utility and yet with out less video storage media than has previously been required;

facilitating or providing the video recordation of such video data in which objects of interest may be highly diverse and either related or unrelated, such as, for example, persons, animals or vehicles, e.g., cars or trucks, whether stationary or moving, and if moving, whether moving in, through, or out of the premises monitored by video cameras;

facilitating or providing the video recordation of such video data where such objects may move at various speeds, may change speeds, or may change directions, or which may become stationary, or may change from stationary to being in motion, or may otherwise change their status;

facilitating or providing the video recordation of such video data where objects may converge, merge, congregate, collide, loiter or separate;

facilitating or providing the video recordation of such video data where the objects may vary according to these characteristics, and/or where the objects vary not only according to the intrinsic nature of specific objects in the field of view, and/or according to their behavior;

facilitating or providing the video recordation of such video data by intelligent, conserving use of video storage media according to an artificial intelligence criteria, which is to say, through automatic, electronic or machine-logic and content controlled manner simulative or representative of exercise of human cognitive skills;

facilitating or providing the video recordation of such video data in such a manner and with format such that the symbolic content of the video data is preserved; and facilitating or providing the video recordation of such video data in such a manner and with format such that the symbolic content of the video data allows the user to "query by content." This enables the user to recall recorded data according to intelligence content of the video, that is, symbolic content of the video, specifically by object attributes of the recorded video. The new system is in other words capable of storing the symbolic content of objects, and then provides for querying according to specified symbolic content. Such contrasts with the prior art by which a person must visually sift through video until an event of interest occurs. Since object selective recording causes recordation of events and time of day for each frame to be recorded, together with the characteristic aspects of the data, most especially the object attributes, a user can query the system such as, for example, by a command like "show fallen persons on camera 314 during the last week. The present system development then will show the fallen-person events with the time and camera noted on the screen.

At its heart, the presently proposed inventive system technology facilitates or provides automatic, intelligent, efficient, media-conserving, video recordation, without constant human control or inspection or real-time human decisional processes, of large amounts of video data by parsing video data according to object and background content and properties, and in accordance with criteria which are pre-established and preset for the system.

An example of a video system in which the present invention can be used to advantage is set forth in U.S. patent application Ser. No. 09/773,475, entitled "System for Automated Screening of Security Cameras", filed Feb. 1, 2001, which is hereby incorporated by reference, and corresponding International Patent Application PCT/US01/03639, of the same title, filed Feb. 5, 2001. For convenience such a system may herein be referred to as "automated screening system."

Such a system may be used to obtain both object and background video, possibly from numerous video cameras, to be recorded as full time digital video by being written to magnetic media as in the form of disk drives, or by saving digitized video in compressed or uncompressed format to magnetic tape for longer term storage. Other recording media can also be used, including, without limiting possible storage media, dynamic random access memory (RAM) devices, flash memory and optical storage devices such as CD-ROM media and DVD media.

In the operation of the presently inventive system, as part of a security system as hereinabove identified, the present invention has the salient and essentially important and valuable characteristic of reducing the amount of video actually recorded on video storage media, of whatever form, so as to reduce greatly the amount of recording media used therefor, yet allowing the stored intelligence content to be retrieved from the recording media at a later time, as in a security system, in such a way that the retrieved data is of intelligently useful content, and such that the retrieved data accurately and faithfully represents the true nature of the various kinds of video information which was originally recorded.

Briefly, the invention relates to a system having video camera apparatus providing output video which must be recorded in a useful form on recording media in order to preserve the content of such images, where the video output consists of background video and object video representing images of objects appearing against a background scene, that is, the objects being present in the scene. The system provides computed knowledge of symbolic categories of objects in the scene and analysis of object behavior according to various possible attributes of the objects. The system thereby knows the intelligence content, or stated more specifically, it knows the symbolic content of the video data it stores. According to the invention, both the spatial resolution and temporal resolution of objects in the scene are varied during operation of the system while recording the background video and object video. The variation of the spatial resolution and temporal resolution of the objects in the scene is based on predetermined interest in the objects and object behavior.

More specifically, in such a system having video camera apparatus providing large amounts of output video which must be recorded in a useful form on recording media in order to preserve the content of such images, the video output is in reality constituted both by (a) background video of the place or locale, such as a parking garage or other premises which are to be monitored by video, and (b) object video representing the many types of images of various objects of interest which at any time may happen to appear against the background. In such a system, which may operate normally for long periods without continuous human inspection or monitoring, video recordation may continuously take place so as to provide a video archive. The objects of interest may, for example, be persons, animals or vehicles, such as cars or trucks, moving in, through, or out of the premises monitored by video.

The objects may, in general, have various possible attributes which said system is capable of recognizing. The attributes may be categorized according to their shape (form), orientation (such as standing or prone), their activity, or their relationship to other objects. Objects may be single persons, groups of persons, or persons who have joined together as groups of two or more. such objects may move at various speeds, may change speeds, or may change directions, or may congregate. The objects may converge, merge, congregate, collide, loiter or separate. The objects may have system-recognizable forms, such as those characteristic of persons, animals or vehicles, among possible others. Said system preferably provides capability of cognitive recognition of at least one or more the following object attributes:

(a) categorical object content, where the term "object content" connotes the shape (i.e., form) of objects;

(b) characteristic object features, where the term "object features" may include relationship, as when two or more objects have approached or visually merged with other objects; and (c) behavior of said objects, where the term behavior may be said to include relative movement of objects. For example, the system may have and provide cognizance of relative movement such as the running of a person toward or away from persons or other objects; or loitering in a premises under supervision.

The term "event" is sometimes used herein to refer to the existence of various possible objects having various possible characteristic attributes (e.g., a running person).

The degree of interest in the objects may vary according to any one or more these characteristic attributes. For example, the degree of interest may vary according to any or all of such attributes as the intrinsic nature of specific objects in the field of view (that is, categorical object content), or characteristic object features; and behavior of the objects.

In the operation of said system, the invention comprises or consists or consists essentially of reducing the amount of video actually recorded so as to reduce the amount of recording media used therefor, and as such involves method steps including:

separating the video output into background video and object video;

analyzing the object video for content according to different possible attributes of the objects therein; and independently storing the background and object video while compressing both the background and object video according to at least one suitable compression algorithm, wherein the object video is recorded while varying the frame rate of the recorded object video in accordance with the different possible objects, the frame rate having a preselected value at any given time corresponding to the different possible objects which value is not less than will provide a useful image of the respective different possible objects when recovered from storage;

wherein the object video is compressed while varying the compression ratio so that it has a value at any given corresponding to the different possible object attributes, the compression ratio at any given time having a preselected value not greater than will provide a useful image of the respective different possible objects when recovered from storage;

recovering the stored object and background video by reassembling the recorded background and the recorded object video for viewing.

As is evident from the foregoing, the present invention is used in a system having video camera apparatus providing output video data which must be recorded in a useful form on recording media in order to preserve the content of such images, specifically an arrangement wherein the system provides computed knowledge, that is, cognitive recognition, of various possible attributes of objects, as will define symbolic content of the objects, including one or more of (a) categorical object content;

(b) characteristic object features, where the term "object features" is defined to include relationship, as when two or more objects have approached or visually merged with other objects; and (c) behavior of said objects, where the term "behavior" is defined as including relative movement of objects in relation to other objects or in relation to a background.

The present invention includes provision for allowing a user of the system to query recorded video images by content according to any of these attributes.

This highly advantageous query feature enables the user to recall recorded video data according to any of the aforesaid object attributes, such as the categorical content, the characteristic features, object behavior, or any combination of the foregoing, as well as other attributes such as date, time, location, camera, conditions and other information recorded in frames of data.

Other objects and features will be apparent or are pointed out more particular hereinbelow or may be appreciated from the following drawings.

DESCRIPTION OF PRACTICAL EMBODIMENTS

Figure 1:
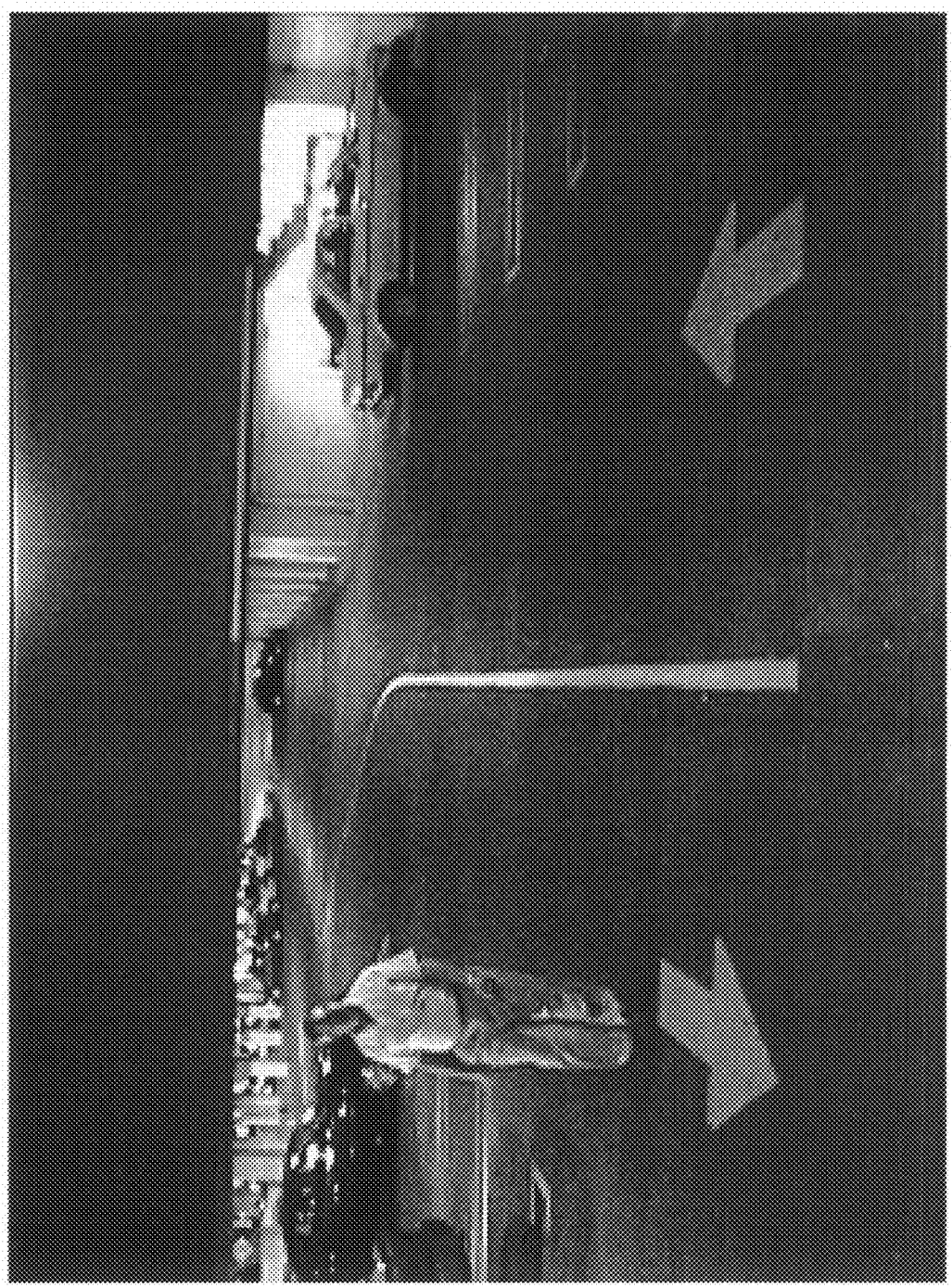
FIG. 1 is a full resolution video image of a scene with one person present

Referring to the drawings, the presently disclosed system for object selective video recording (herein called "the OSR system" for convenience, is made possible by content sensitive recording. The present system is disclosed as used, for example, in a "System for Automated Screening of Security Cameras" as set forth in above-described application Ser. No. 09/773,475, and such system is herein called for convenience "the automated screening system."

General Precepts of Content Sensitive Recording

The automated screening system has internal knowledge, that is, cognitive recognition, of the symbolic content of video from multiple, possibly numbering in dozens or hundreds, of video cameras. Using the security system knowledge of image output of these cameras it is possible to achieve higher degrees of compression by storing only targets in such video that are of greater levels of interest (e.g., persons vs. vehicles). The system preferably provides capability of cognitive recognition of at least one or more of a plurality of preselected possible object attributes, including one or more of the following object attributes:

(a) categorical object content, where the term "object content" connotes the shape (i.e., form) of objects as may be used to identify the type of object (such as person, animal, vehicle, or other entity, as well as an object being carried or towed by such an entity);

(b) characteristic object features, where the term "object features" may include relationship, as when two or more objects have approached or visually merged with other objects; and (c) behavior of said objects, where the term "behavior" may be said to include relative movement of objects, as for example, in relation to other objects.

In the current OSR embodiment, video storage is based on predetermined, preset symbolic rules. Examples of symbolic rules for the present purposes are:

Save background only once/min at 50:1 compression (blurred but usable).

Save images of cars at 50:1 compression (blurred but usable).

Save images of people at 20:1 compression (good clear image).

The term "usable" has reference to whether the recorded video images are useful for the automated screening system. Further, "usable" will be understood to be defined as meaning that the video images are useful for purposes of any video recording and/or playback system which records video images in accordance with the present teachings, or any other system in which, for example, relatively large amounts of video must be recorded or which will benefit by use or incorporation of the OSR system.

In the automated screening system, on playback of stored video, images of cars and persons are placed over the background, previously recorded, in the position where they were recorded.

System storage requirements for the OSR system are dependent on activity in the scene. As an example of a typical video camera in a quiet area of a garage there may be a car in view ten percent of the time and a person in view ten percent of the time. The average size of a person or car in the scene is typically one-eighth of view height and one-eighth of view width.

Example I

For this example, storing video data of cars and persons at 5 frames per second (FPS) yields:

|  | COMPONENT | | |
| --- | --- | --- | --- |
|  | Background | Cars | Persons |
| Bytes/pixel |  |  | 3 |
|  |  | 3 | 3 |
| * Pixels/row/frame | 320 | 40 | 40 |
| * Pixels/column/frame | 240 | 30 | 30 |
| * Frames/second | 1/60 | 5 | 5 |
| * Second/minute | 60 | 60 | 60 |
| * Minutes/hour | 60 | 60 | 60 |
| * Fraction time present | 1.0 | 0.1 | 0.1 |
| * Compression ratio | 1/50 | 1/50 | 1/20 |
| BYTES/HOUR/ COMPONENT | 276,480 + | 129,600 + | 324,000 |

Total Bytes/hour = 730,080 Bytes/hour, or about .713 MB/hour

In this example, the storage requirement is reduced by factor of 271 compared to conventional compression (193 ME/hour) while using the same compression rate for persons. Compared to uncompressed video (93 GB/Hr), the storage requirements are reduced by a factor of 130,080.

End of Example I

Video Storage Overview

The conventional video tape model of recording uses the same amount of video storage media (whether magnetic tape, or disk drive, or dynamic computer memory, merely as examples) for every frame, and records on the storage media at a constant frame rate regardless content of the video. Whatever the quality of the recorded video, it remains fully intact until the magnetic tape, for example, is re-used. On tape re-use, the previously stored video is completely lost in a single step.

Human memory is very different. The human mind is aware of the content of what is being seen and adjusts the storage (memory) according to the level of interest. Mundane scenes like an uneventful drive to work barely get entered in visual memory. Ordinary scenes may be entered into memory but fade slowly over time. Extraordinary scenes such the first sight of your new baby are burned into memory for immediate recall, forever. If the human memory worked like a VCR with two weeks worth of tapes on the shelf, you could remember the license number of the white Civic that you passed a week ago Thursday, but forget that tomorrow is your anniversary. The human memory model is better but requires knowledge that is not available to a VCR.

Specifics of Object Selective Recording

The concept of Object Selective Recording (OSR) is intended to perform video recording more like the human model. Given the knowledge of the symbolic names of objects in the scene, and an analysis of the behavior of the objects or other object attributes herein described, it is possible to vary either or both of the spatial resolution and temporal resolution of individual objects in the scene based on the interest in the object and the event.

The so-called analysis worker module of the above-described application Ser. No. 09/773,475 describing an automated screening system has several pieces of internal knowledge that allows the more efficient object selective recording of video.

That is, the analysis worker module is capable of separating the video output provided by selected video cameras into background video and object video; and then analyzing the object video for content according to different possible objects in the images and the attributes of the different objects.

An adaptive background is maintained representing the non-moving parts of the scene. Moving objects are tracked in relation to the background. Objects are analyzed to distinguish cars from people, from shadows and glare.

Cars and people are tracked over time to detect various events. Events are preselected according to the need for information, and image knowledge, in the presently described automated screening system with which the OSR system will be used. As an example, types of events suitable for the automated screening system, as according to above-described application Ser. No. 09/773,475, may be the following representative events which can be categorized according to object attributes:

Single person
Multiple persons
Converging persons
Fast person
Fallen person
Erratic person
Lurking person
Single car
Multiple cars
Fast car
Sudden stop car The foregoing categories of objects and classes of activities of such objects, as seen by video cameras upon an image background (such as garage structure or parking areas in which video cameras are located), are illustrative of various possible attributes which can be identified by the automated screening system of above-identified application Ser. No. 09/773,475.

Still other categories and classes of activities, characterized as object attributes, which might be identified by a known video system having video cameras providing relatively large amounts of video output by such cameras which video could be recorded on recording media which has capability for definitively identifying any of a multiplicity of possible attributes of video subjects as the subjects (whether animate or inanimate). Thus, the automated screening system (or other comparable system which the OSR system is to be used), may be said to have knowledge of the attributes characteristic of the multiple categories and classes of activities. It is convenient for the present purposes to refer to these attributes as characteristic objects. Thus, multiple people and sudden stop car are illustrative of two different characteristic objects. The screening system (whether the automated screening system of above-identified application Ser. No. 09/773,475) or another system with which the present OSR system is used, may be said to have knowledge of each of the possible characteristic objects (herein simply referred to henceforth as object) represented in the above exemplary list, as the screening system carries out the step of analyzing video output of video cameras of the system for image content according to different possible characteristic objects in the images seen by said cameras.

So also, a video image background for a respective camera might in theory be regarded either as yet another type of characteristic object, in the present disclosure, the background is treated as being a stationary (and inanimate) video image scene, view or background structure which, in a camera view, a characteristic object may occur. is not only inanimate but of a characteristic object.

Object Selective Recording (OSR) in accordance with the present disclosure uses this internal knowledge of objects in output video to vary both the Frames Per Second (FPS) and compression ratio used to record the objects in video that has been analyzed by the automated screening system. The background and object are compressed and stored independently and then reassembled for viewing.

Every video frame is not the same. Like a human periodically focusing on objects and just location tracking otherwise, the presently described OSR system periodically saves a high-resolution frame of an object and then grabs a series of lower resolution frames.

Vary Background Storage

The background may be recorded at a different frame rate than objects in the scene. The background may be recorded at a different compression ratio than objects in the scene. For example the adaptive background may be recorded once per minute at a compression ratio of 100:1 while objects are recorded at four frames/second at a compression ratio of 20:1.

The background may be recorded at different compression ratios at different times. For example, the background is recorded once per minute (0.0166 FPS) with every tenth frame at a compression ratio of 20:1 while the other nine out of each ten frames compressed to 100:1. This example would have the effect of taking a quick look at the background once per minutes, and a good look every ten minutes.

When a background change is detected, and a new background generated, the new background is stored and the count for FPS restarted.

This leads to four configuration variables for background Storage:
 BkgndFPS=Background normal FPS, in above example 0.0166.
 BkgndNormRatio=Background normal compression ratio,
 in the above example 100.
 BkgndGoodRatio=Background Good ratio,
 in the above example 20
 BkgndNormFrames=Background normal frames, frames between good ratios, in the above example 9.

Vary Object Storage

People may be normally recorded at different frame rates and compression ratios than cars. For example, people may normally be recorded at 4 FPS and a compression ratio of 20:1 while cars are normally recorded at 2 FPS and a compression ratio of 40:1.

Objects may be recorded at different compression rates at different times. For example, people are recorded at 4 FPS with every eighth frame at a compression ratio of 10:1 while the other seven out of each eight frames compressed to 20:1. In the same example cars are recorded at 2 FPS with every 16th frame at a compression ratio of 20:1 while the other 15 out of each 16 frames compressed to 40:1. This example would have the effect of taking a quick look at people every quarter of a second, and a good (high resolution) look every two seconds. In the same example the effect would be to take a quick look at cars every ½ second and a good look every 8 seconds. Also every fourth good look at people would include a good look at cars.

Cars may have a different number of normal compression frames between good frames than people. However, every stored frame must be consistent. If only cars are present then the frame rate must be the higher of the two. The compression rate for all people will be the same in any one frame. The compression rate for all cars will be the same in any one frame. In any frame where the cars are at the better compression rate, the people will also be at the better rate. When people are at the better compression, cars may be at the normal compression.

This leads to six configuration variables for storage of car and people images.
 CarNormRatio=Normal compression ratio for cars,
 in the example above 40:1
 CarGoodRatio=Good compression ratio for cars,
 in the example above 20:1
 PersonNormRatio=Normal compression ratio for people,
 in the example above 20:1
 PersonGoodRatio=Good compression ratio for people,
 in the example above 10:1
 PersonNormFrames=Normal frames between good frames,
 in the example above 7
 GoodCarPerGoodPersonFrame=Good car frames per good person,
 in the example above ¼

Vary Storage by Event

The eleven events detected by the automated screening system are used to revise a preset "level of interest" in the video at the time of the event detection, by providing boost of resolution for a predetermined time interval according to object event attributes. The following table is an example configuration listing, where each event has three parameters:
 Person Boost=The apparent increase in resolution for people for the event.

Car Boost=The apparent increase in resolution for cars for the event.

Seconds=The number of seconds that the boost stays in effect after the event.

| EVENT | PERSON BOOST | CAR BOOST | SECONDS |
|---|---|---|---|
| Single person | 1 | 1 | 0 |
| Multiple people | 2 | 1 | 2 |
| Converging people | 3 | 1 | 3 |
| Fast person | 3 | 1 | 3 |
| Fallen person | 4 | 1 | 5 |
| Erratic person | 2 | 1 | 2 |
| Lurking person | 2 | 1 | 2 |
| Single car | 1 | 1 | 0 |
| Multiple cars | 1 | 2 | 1 |
| Fastcar | 1 | 3 | 3 |
| Sudden stop car | 1 | 3 | 3 |

OSR File Structure

Disk files for OSR video are proprietary. The compression is based on industry standards for individual frames, but the variable application of the compression is unique to OSR. The file name will identify the camera and time of the file and the file suffix will be OCR. The file name will be in the form of:

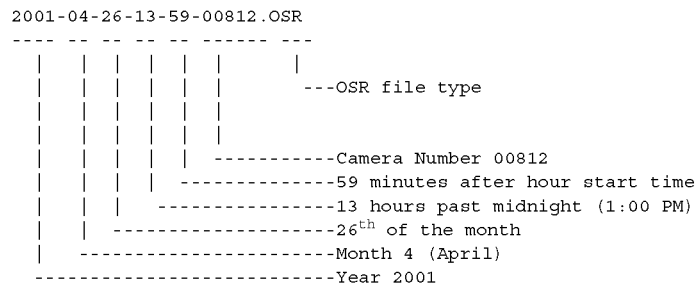

```
2001-04-26-13-59-00812.OSR
---- -- -- -- -- ------ ---
  |   |  |  |  |   |     |
  |   |  |  |  |   |     ---OSR file type
  |   |  |  |  |   |
  |   |  |  |  |   ----------Camera Number 00812
  |   |  |  |  --------------59 minutes after hour start time
  |   |  |  -----------------13 hours past midnight (1:00 PM)
  |   |  --------------------26ᵗʰ of the month
  |   -----------------------Month 4 (April)
  --------------------------Year 2001
```

Dashes are included in the file name for clarity. The file name in the example that starts on 1:59 PM of Apr. 26, 2001 with the video from Camera 812 would thus be, as shown:

2001-04-26-13-59-00812.OSR

Headers

Three types of headers are defined with the OSR file type:

File headers, one header at the beginning of each file.

Frame headers, one header at the beginning of each stored frame.

Image headers, one header for each image component of each frame.

File Headers

There is one file header at the beginning of each file with seven fixed length elements:

File identity, 11-character string, ❈<CO. NAME>OSR❈

Camera identity, 3 bytes for Worker Id, Super Id, Node Man Id.

File Start Time, a date variable

Compression type code, a character code with a defined meaning such as "JPEG" or "JPEG2000"

Software version, a 6-character string such as "01.23a" for the version of the <CO. NAME> software used.

Seconds since midnight, a single type with fractional seconds since midnight for file start.

Checksum, an encrypted long that is a checksum of the rest of the header. Its use is to detect changes.

Frame Headers

There is one frame header at the beginning of each frame with eight fixed length elements. Some frames will include a new background and some frames will reference an older background image. Specific frame header components are:

Start of frame marker, a one character marker "< >" just to build confidence stepping through the file.

Seconds since midnight, a single type with fractional seconds since midnight for frame time.

Event Flag, a 16 bit variable with the 11 lower bits set to indicate active events.

Number of targets, a byte for the number of targets to insert into this frame.

Offset to the background image header for this frame, a long referenced to start of file.

Offset to the first image header for this frame, a long referenced to start of file.

Offset to the prior frame header, a long referenced to start of file.

Offset to the Next frame header, a long referenced to start of file.

Image Headers

There is one header for each stored image, target or background, each header with nine fixed length elements. If the image is a background, the offset to the next image header will be −1 and the ROI elements will be set to the full size of the background. Specific image header components are:

Start of image marker, a one character marker "B" for background image or "T" for target.

Offset to the next image header for this frame, a long referenced to start of file.

Degree of compression on this image, a byte as defined by the software revision and standard.

Top, a short variable for the location of the top of the image referenced to the background.

Bottom, a short variable for the location of the bottom of the image referenced to the background.

Left, a short variable for the location of the left of the image referenced to the background.

Right, a short variable for the location of the right of the image referenced to the background.

Checksum, a long variable encrypted value to detect changes in the compressed image.

Image length, a long variable, the number of bytes in the compressed image data.

Image Data

Compressed image data is written to disk immediately following each image header.

OSR Interface to Analysis Program

Analysis of object content and position is most preferably performed by analysis worker module software, as generally according said application Ser. No. 09/773,475. While analysis is in such automated screening system software driven, such analysis may instead be realized with a hardware solution. The OSR system feature adds three main functions to the analysis software to Open an OSR file, Write frames per the rules disclosed here, and close the file. The following OSR process functions are illustrative:

Function OpenNewOSRfile Lib "MotionSentry.dll"
    (ByVal ErrString As String,
    ByRef FileHeader
    As FileHeaderType,
    ByVal FileName As String) As Long
    Opens a new OSR file "FileName", and returns a file handle.
Function CloseOSRfile Lib "MotionSentry.dll"
    (ByVal ErrString As String,
    ByVal FileHandle As Long)
    As Boolean
    Closes the file of "FileHandle" (returned by OpenNewOSRfile).
Function WriteFrameToDisk_
    (ByVal ErrString As String,_
    ByVal FileHandle As Long,_
    ByVal ImagePtr As Long,_
    ByVal BackgroundPtr As Long,_
    ByRef BackgroundHeader
    As ImageHeaderType,_
    ByRef FrameHeader As
    FrameHeaderType,_
    ByRef ImageHeaders
    As ImageHeaderType)
    As Boolean writes a single frame to the open OSR file where:

FileHandle indicates the file to receive the data.

ImagePtr indicates the location of the image buffer with Objects to be recorded.

BackgroundPtr indicates the location of the background image

BackgroundHeader indicates the header for the background image. If background is not required for the frame, then Degree Of Compression is set to −1.

FrameHeader is the header for the frame filled out per the rules above.

ImageHeaders is an array of image headers, one for each image, filled out per the rules above.

Example II

Referring to the drawings, FIG. 1 shows an actual video image as provided by a video camera of the automated screening system herein described as used in a parking garage, showing a good, typical view of a single human subject walking forwardly in the parking garage, relative to the camera. Parked vehicles and garage structure are evident. The image is taken in the form of 320×240 eight bit data. the person is about 20% screen height and is walking generally toward the camera so that his face shows. The image has 76,800 bytes of data.

Figure 2:
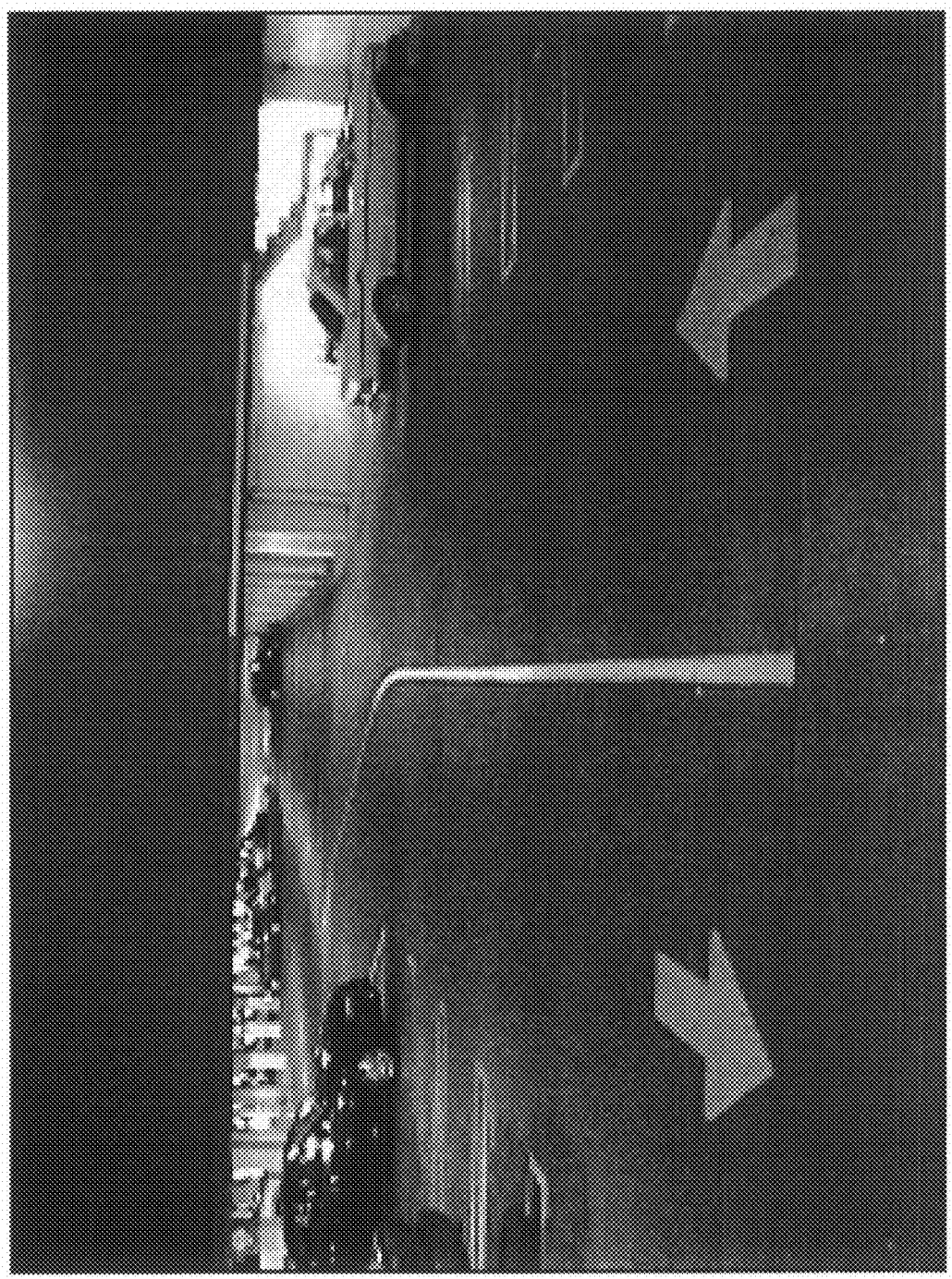
FIG. 2 is the background of FIG. 1 with heavy video compression.

FIG. 2 shows the background of the video scene of FIG. 1, in which the a segment of pixel data representing the image of the subject has been extracted. The background data will be seen to be heavily compressed, as by JPEG compression protocol. Although noticeably blurred in detail, the background data yet provide on playback sufficient image information of adequate usefulness for intended review and security analysis purposes. The JPEG-compressed image is represented by 5400 bytes of data.

Figure 3:
FIG. 3 is the person of FIG. 1 with light video compression.

FIG. 3 shows the subject of the video scene of FIG. 1, in which the a block of pixel data representing the walking subject has been less heavily compressed, as again by JPEG compression protocol. The compressed subject data yet provide on playback greater detail than the background image information, being thus good to excellent quality sufficient for intended review and security analysis purposes. The JPEG-compressed subject image is represented by 4940 bytes of data.

The compressed images of FIGS. 2 and 3 may be saved as by writing them to video recordation media with substantial data storage economy as compared to the original image of FIG. 1. The economy of storage is greater than implied by the sum (5400 bytes and 4940 bytes) of the subject and background images, as the background image may be static over a substantial period of time (i.e., until different vehicles appear) and so need not be again stored, but each of several moving subjects (e.g., persons or vehicles) may move across a static background. Then only the segment associated with the subject(s) will be compressed and stored, and can be assembled onto the already-stored background. As only those segments of data which need to be viewed upon playback will be stored, the total data saved by video recordation or other data storage media is greatly minimized as compared to the data captured in the original image of FIG. 1.

Figure 4:
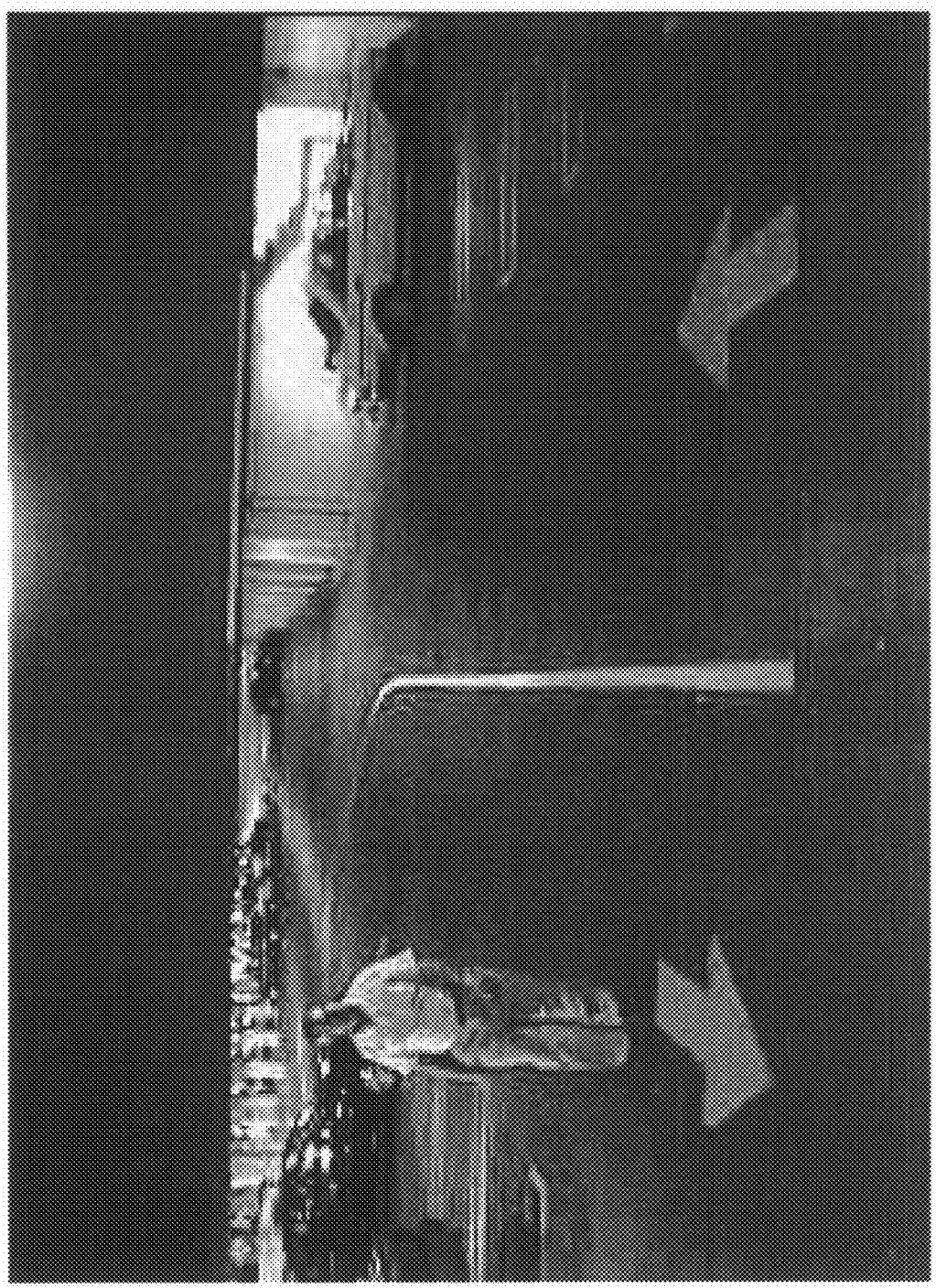
FIG. 4 is the assembled scene with FIG. 3 overlaid on FIG. 2, and thus representing a composite compressed image of subject and background.

FIG. 4 shows an assembled scene from the above-described JPEG-compressed background and subject data. FIG. 4 represents the composite scene as it viewable upon playback. Good to excellent information is available about both the subject and the background. The overall quality and information thus provided will be found more than sufficient for intended review and security analysis purposes.

End of Example II

Playback

Playback of data representing stored images is assumed to be requested from a remote computer. A process local to the OSR disk reads the disk file for header data and compressed image data to transmit to a remote computer where the images are uncompressed and assembled for viewing. Both processes are ActiveX components.

The playback features allow a user of the system to query recorded video images by content characteristics and/or behavior (collectively called "query by content", enabling the user to recall recorded data by specifying the data to be searched by the system in response to a system query by the user, where the query is specified by the content, characteristics and/or behavior of the which the user wishes to see, as from a repertoire of predefined possible symbolic content. Given the capability of the automated screening system to provide computed knowledge of the categorical content of recorded images, characteristic features of recorded images, and/or behavior of subjects of the images, the playback capabilities of the present invention include provision for allowing a user of the system to query recorded video images by content by enabling the user to recall recorded video data according to said categorical content, said characteristic features or said behavior, or any or all of the foregoing image attributes, as well as also by date, time, location, camera, and/or other image header information.

For example, a query may call for data on Dec. 24, 2001, time 9:50a to 10:15a at St. Louis Parking Garage 23, camera 311, "lurking person", so that only video meeting those criteria will be recalled, and then will be displayed as both background and object video of a lurking person or persons.

The process that reads the disk file is OsrReadServer.exe. OsrReasServer is a single use server component. Where multiple views are requested from the same computer, multiple instances of the component will execute.

The process that shows the video is OsrReadClient.exe. OsrReadClient is client only to OsrReadServer but is capable of being a server to other processes to provide a simplified local wrapper around the reading, transmission, assembly and showing of OSR files.

GetOSRdata

The OsrReadServer module is a "dumb" server. It resides on a Video Processor computer and is unaware of the overall size of the automated screening system. It is unaware of the central database of events. It is unaware of the number of consoles in the system. It is even unaware of the number and scope of the OSR files available on the computer where it resides. The OsrReadServer module has to be told the name of the OSR file to open, and the time of day to seek within the file. After the selected place in the file is reached, the client process must tell OsrReadServer when to send the next (or prior) frame of image data.

The OsrReadServerprocess has one class module, ControlOSRreadServer, which is of course used to control the module. OsrReadserver exposes the following methods:

Function AddObjectReference (Caller As Object, ByVal MyNumber As Long) As Boolean Get an object from the client for asynchronous callbacks.

Function DropObjectReference (Caller As Object) As Boolean

Drops the callback object.

Function Command (ByVal NewCommand As String, ByVal CommandParm As String) As Boolean Call here with a command for the server to handle.

This function allows extension of the interface without changing compatibility.

Sub ListosrFilesReq (ByVal StartDate As Date, ByVal EndDate As Date, ByVal CameraNumber As Long)

Call here to request a listing of all of the OSR files on the machine where this process resides.

Sub OpenNewOsrFileReq (ByVal NewFileName As String)

After selecting an available file from ListOsrFiles, the client calls here to request that the file be opened.

Sub ReadImageHeaderReq (ByVal ImageType As Long)

The client calls here to request reading the next image header in the frame identified by the last frame header read. Image headers are always read forward, the first in the frame to the last. Only frame headers can be read backwards.

Sub ReadImageDataReq ( )

The client calls here to request reading the image data in the frame identified by the last image header read.

Sub FindNextEventReq (ByRef EventsWanted ( ) As Byte)

The client calls here to request reading the next frame header that has an event that is selected in the input array. The input array has NUM_OF_EVENTS elements where the element is 1 to indicate that event is wanted or zero as not wanted. If a matching frame is found in the current file then JustReadFrameHeader is called, else call ReportEventCode in the client object with code for event not found.

OSRreadClient

The OSRreadClient process has a class module that is loaded by the OSRreadServer module, it is OSRreadCallbackToClient. It is of course used to report to the OSRreadClient process. This is the Object that is loaded into the OSRreadServer process by the AddObjectReference call. The OSRreadCallbackToClient class module exposes the following methods.

Sub JustReadFileHeader (ByVal ServerId As Long, ByRef NewFileHeader As FileHeaderType)

The server calls here when a new file header is available

Sub JustReadFrameHeader (ByVal ServerId As Long, ByRef NewFrameHeader As FrameHeaderType)

The server calls here when a new frame header is available.

Sub JustReadImageHeader (ByVal ServerId As Long, ByRef NewImageHeader As ImageHeaderType)

The server calls here when a new image header is available.

Sub JustReadImageData (ByVal ServerId As Long, ByRef NewImageData As ImageDataType)

The server calls here with new compressed image data matching the last Image Header.

Sub ImReadyToGo (ByVal ServerId As Long)

The server calls here when all configuration chores are done and it is ready to accept commands.

Sub ImReadyToQuit (ByVal ServerId As Long)

The server calls here when all shut down chores are complete and it is ready for an orderly shut down.

Sub ReportException (ByVal ServerId As Long, ByVal Description As String)

The server calls here to report some exception that needs to be reported to the user and logged in the exception log. Any number of exceptions may be reported here without affecting compatibility.

Sub ReportEventCode (ByVal ServerId As Long, ByVal EventCode As Long)

The server calls here to report the code for normal events. The list of codes may be extended without affecting compatibility.

1=Past end of file reading forwards
2=At beginning of file reading backwards
3=Could not find that file name
4=could not open that file
5=Disk read operation failed
6=Event Not Found Sub OSRfilesFound (ByVal ServerId As Long, ByRef FileList As DirectoryEntriesType)

The server calls here to list the OSR files found that match the last request parm.

The OSR system here described can also be provided with a class module that can be loaded to allow image selection from one or more other processes that are available through operator input.

For example, as an available hook for future integration, OSRreadClient has a class module that can be loaded by other ActiveX components to allow the same type of image selection from another process that are available through operator input. The class module is named ControlShowData and it is of course used to control the OSRreadClient process.

The hook exposes the following methods:

SelectOSRsource (CameraNum as Long, StartTime as Date, StopTime As Date, MonitorGroup as String, EventCode As Long, MinScore as Long)

ShowFrame (PriorNext as integer, DestWindow As long)

Therefore, it will now be appreciated that the present invention is realized in a system having video camera apparatus providing large amounts of output video which must be recorded in a useful form on recording media in order to preserve the content of such images, the video output consisting of background video and object video representing images of objects appearing against the background, the improvement comprising video processing apparatus for reducing the amount of video actually recorded so as to reduce the amount of recording media used therefor, the system including a software-driven video separator which separates the video output into background video and object video, and a software-driven analyzer which analyzes the object video for content according to different possible objects in the images and different possible kinds of object attributes; the system improvement comprising:

a storage control which independently stores the background and object video while compressing both the background and object video according to at least one suitable compression algorithm, wherein:

the object video is recorded while varying the frame rate of the recorded object video in accordance with the different possible objects or different kinds of object behavior, or both said different kinds of objects and different kinds of object behavior, the frame rate having a preselected value at any given time corresponding to the different possible objects which value is not less than will provide a useful image of the respective different possible objects when recovered from storage; and the object video is compressed while varying the compression ratio so that it has a value at any given corresponding to the different possible objects or different kinds of object behavior, or both said different kinds of objects and different kinds of object behavior, the compression ratio at any given time having a preselected value not greater than will provide a useful image of the respective different possible objects when recovered from storage; and video recovery and presentation provision to present the stored object and background video by reassembling the recorded background and the recorded object video for viewing.

In view of the foregoing description of the present invention and practical embodiments it will be seen that the several objects of the invention are achieved and other advantages are attained.

Various modifications could be made in the constructions and methods herein described and illustrated without departing from the scope of the invention, accordingly it is intended that all matter contained in the foregoing description or shown in the accompanying drawings shall be interpreted as illustrative rather than limiting.

For example, in addition to analysis of video according to attributes of objects, systems according to the present invention may also provide for analysis of video according attributes of background in which the objects appear.

The present invention should not be limited by any of the above-described exemplary embodiments, but instead defined only in accordance with claims of the application and their equivalents.

What is claimed is:

1. A system for selective video recording, comprising:
a video camera that provides output video;
a video separator that separates the output video into object video including one or more objects and background video against which the one or more objects appear;
a video analysis module that respectively identifies each of the one or more objects as a predetermined type of object by tracking each of the one or more objects over two or more video frames; and
a storage control module that independently stores the object video and background video, an object from the one or more objects being associated with an image header having an indication that the object is one of several predetermined types of objects, the image header having coordinate data associated with a position of the object in relation to the background video, the background video being associated with an image header having an indication that the background video is a background video,
wherein each of the one or more objects is recorded at a respective frame rate corresponding to the predetermined type of object identified by the video analysis module.

2. The system of claim 1, wherein the object from the one or more objects is a first object, the first object being identified as a first predetermined type of object and being recorded at a first frame rate, a second object from the one or more objects being identified as a second predetermined type of object and being is recorded at a second frame rate.

3. The system of claim 1, wherein the object from the one or more objects is recorded at a first frame rate for a first number of frames and is recorded at a second frame rate for a second number of frames.

4. The system of claim 1, wherein each of the one or more objects is recorded at a respective compression ratio corresponding to the predetermined type of object identified by the video analysis module.

5. The system of claim 4, wherein the object from the one or more objects is a first object, the first object being identified as a first predetermined type of object and being recorded at a first compression ratio, a second object from the one or more objects being identified as a second predetermined type of object and being recorded at a second compression ratio.

6. The system of claim 5, wherein the first object from the one or more objects is recorded at a first frame rate and the second object from the one or more objects is recorded at a second frame rate.

7. The system of claim 4, wherein the object from the one or more objects is a first object, the first object being recorded at a first compression ratio for a first number of frames, the first object being recorded at a second compression ratio for a second number of frames.

8. The system of claim 7, wherein the first object from the one or more objects is recorded at a first frame rate for the first number of frames and is recorded at a second frame rate for the second number of frames.

9. The system of claim 1, wherein the background video is recorded at a different frame rate than the one or more objects in the object video.

10. The system of claim 1,
wherein the storage control module further stores a textual identification of the type of each of the one or more objects; and
further comprising a query module configured to receive a textual query that specifies at least one object type of interest and to retrieve, based on the textual identification of each of the one or more objects, object video and background video stored by the storage control module that corresponds to the textual query.

11. The system of claim 1, further comprising:
a playback control module that retrieves the object video and the background video and reconstructs the output video using the object video, the background video and the coordinate data from the image header associated with the object from the one or more objects.

12. The system of claim 1, wherein the object from the one or more objects is a sudden stop car or a fallen person.

13. The system of claim 1, wherein the object from the one or more objects is a first object, a second object from the one or more objects being associated with an image header having an indication that the second object is an object and having coordinate data associated with a position of the second object in relation to the background video.

14. The system of claim 1, wherein the background video is recorded at a different compression ratio than the one or more objects in the object video.

\* \* \* \* \*

UNITED STATES PATENT AND TRADEMARK OFFICE
CERTIFICATE OF CORRECTION

PATENT NO. : 7,650,058 B1
APPLICATION NO. : 10/041402
DATED : January 19, 2010
INVENTOR(S) : Maurice V. Garoutte It is certified that error appears in the above-identified patent and that said Letters Patent is hereby corrected as shown below:

Claim 2, Column 18, line 36, replace "being is recorded" with -- being recorded --.

Signed and Sealed this

Sixth Day of April, 2010

David J. Kappos
*Director of the United States Patent and Trademark Office*